May 11, 1943.  H. H. FEBREY  2,318,604
RAIL BOND
Filed Oct. 17, 1941

Inventor:
HAROLD H. FEBREY,
by John E. Jackson
His Attorney.

Patented May 11, 1943

2,318,604

UNITED STATES PATENT OFFICE 2,318,604

RAIL BOND

Harold H. Febrey, South Orange, N. J., assignor to The American Steel and Wire Company of New Jersey, a corporation of New Jersey Application October 17, 1941, Serial No. 415,492

2 Claims. (Cl. 22—203)

This invention relates in general to rail bonds, but it is particularly concerned with the art of installing rail bonds by the exothermic welding method.

Welding by this method is accomplished by reacting, in a crucible, an exothermic welding mixture, this producing molten welding metal which is then discharged into a mold which confines the molten metal to the area to be welded. In the case of rail bonds, this area is that surrounding the conductor strand ends and the adjacent rail sides. The object of the present invention is to provide for more firmly welding the conductor ends to the rail sides.

A specific example of the invention is illustrated by the accompanying drawing, in which.

Figure 1:
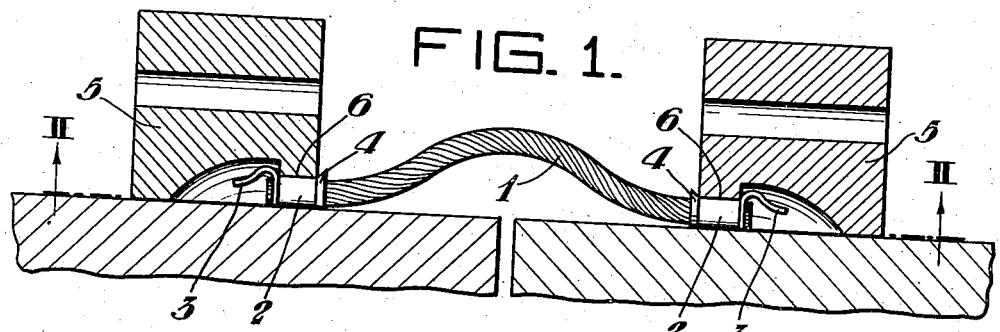
Figure 1 is an elevational view, partly in section, showing a rail bond positioned for welding by the method of my invention.
Figure 2:
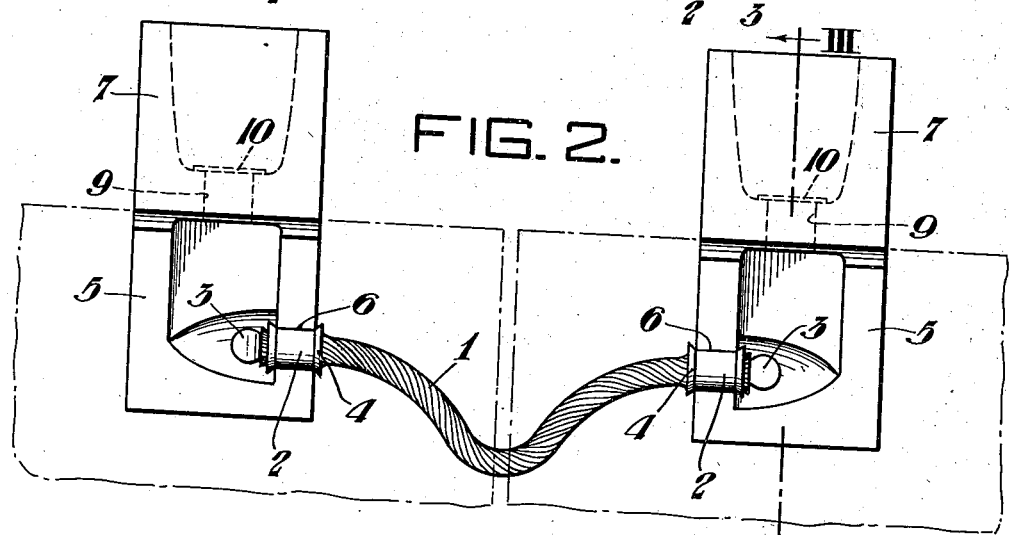
Figure 2 is an elevational view thereof taken on the line II—II of Figure 1.
Figure 3:
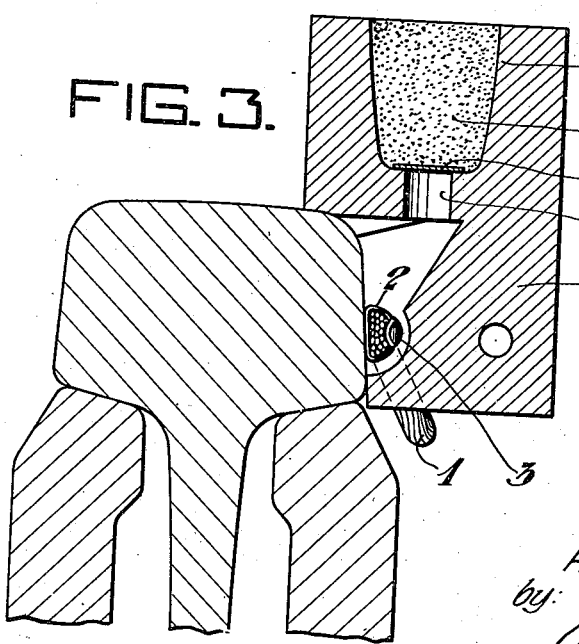
Figure 3 is an enlarged cross-section taken on the line III—III of Figure 2.

More particularly, these drawings show a rail bond intended for application, by the exothermic welding method, to the sides of the heads of the rails to be bonded. The bond comprises a conductor strand 1 made of intertwisted wires, and it is characterized by having terminals which each provide a smooth-surfaced ferrule 2 and a projection 3 in the form of a longitudinally extending tongue that curves inwardly from the ferrule end towards the strand axis. Also, at the inner end of this ferrule 2, a flared portion 4 is provided. The terminal is illustrated as being made from pressed sheet metal, but it could be made of solid metal butt-welded to the strand ends. In the case of the example illustrated, the strand wires are interjoined at the strand ends by fusion welding, which may be accomplished most expeditiously by cutting the length of strand from a longer length by the electric fusion method.

Heretofore, bonds of this character have been made simply from a length of strand made of intertwisted wires, no terminals being provided, excepting by the casting of the exothermically produced molten metal. By first providing the length of strand with the terminals described, a more firmly attached bond results.

In use, the bond is arranged at the rail joint with its terminals positioned so their projections are in vertical planes opposite the rail head sides, the usual molds 5 then being placed in position so that the mold openings 6 through which the strand ends project, encompass the smooth-surfaced ferrules 2. This, in conjunction with the inwardly extending flared portions 4 which serve to properly position the ferrules in the mold openings 6, provides for tight seals at these locations. This has heretofore been impossible because of the nature of the conductor strand.

The crucible portions 7 of the molds are then filled with a suitable exothermic welding mixture 8 which may, for instance, consist of copper oxide, powdered copper and aluminum. The sprues 9 are closed at this time by heat-destructible seals 10. Ignition of the mixture 8 produces the molten welding metal which destroys the seals 10 and discharges into the molds 5, which have internal contours shaped to form nice-appearing welds.

When the metal discharges into the molds, it surrounds the projections 3 so as to effect a firmer anchoring of the strand ends. At the same time, the natural flow of the metal is not interfered with.

I claim:

1. A rail bond for application by exothermic welding, comprising a stranded wire conductor having end terminals, each providing a projection about which the exothermically produced molten welding metal may be cast, said projections being in the form of longitudinally projecting tongues which curve toward the axis of said strand.

2. A method of installing a rail bond by the exothermic welding method, and which is characterized by the steps of applying a terminal to the rail bond conductor strand which provides a projection beyond the end of said strand, and arranging said terminal respecting the mold into which the exothermic welding metal is cast so that said metal is cast around said projection, the latter being in the form of a thin tongue arranged in a vertical plane so as not to interfere with the natural flow of said metal and which curves inwardly toward the axis of said strand.

HAROLD H. FEBREY.